(12) United States Patent
Faurie

(10) Patent No.: US 10,504,671 B2
(45) Date of Patent: Dec. 10, 2019

(54) ROTARY ACTUATOR COMPRISING A HOMOGENEOUSLY ILLUMINATED DISPLAY AREA

(71) Applicant: Siemens Aktiengesellschaft, München (DE)

(72) Inventor: Jean Jacques Faurie, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 158 days.

(21) Appl. No.: 15/537,149

(22) PCT Filed: Oct. 29, 2015

(86) PCT No.: PCT/EP2015/075140
§ 371 (c)(1),
(2) Date: Jun. 16, 2017

(87) PCT Pub. No.: WO2016/096225
PCT Pub. Date: Jun. 23, 2016

(65) Prior Publication Data
US 2017/0345590 A1     Nov. 30, 2017

(30) Foreign Application Priority Data

Dec. 19, 2014   (DE) ........................ 10 2014 226 621

(51) Int. Cl.
*H01H 19/02*   (2006.01)
*H01H 9/18*    (2006.01)
*F21V 8/00*    (2006.01)

(52) U.S. Cl.
CPC ......... *H01H 19/025* (2013.01); *G02B 6/0008* (2013.01); *G02B 6/0016* (2013.01); *H01H 9/182* (2013.01); *H01H 2219/06* (2013.01); *H01H 2219/062* (2013.01)

(58) Field of Classification Search
CPC .. G02B 6/0016; G02B 6/0008; H01H 19/025; H01H 9/182; H01H 2219/06; H01H 2219/062
See application file for complete search history.

(56) References Cited

U.S. PATENT DOCUMENTS

| 6,767,104 B2 * | 7/2004 | Worrell ............... H01H 19/025 362/23.19 |
| 6,948,824 B2 * | 9/2005 | Miwa ..................... G01D 11/28 362/23.13 |
| 7,780,325 B2 * | 8/2010 | Collomb ............... H01H 19/14 362/551 |

(Continued)

FOREIGN PATENT DOCUMENTS

| DE | 69805907 T2 | 11/2002 |
| EP | 1653489 A2  | 5/2006  |

(Continued)

*Primary Examiner* — Anh T Mai
*Assistant Examiner* — Arman B Fallahkhair
(74) *Attorney, Agent, or Firm* — Henry M. Feiereisen LLC

(57) ABSTRACT

A rotary actuator includes a cylindrical main body and an actuating handle which is placed on the cylindrical main body. The actuating handle includes a display area that can be illuminated. A light source is arranged in the cylindrical main body and emits light that is reflected via a first reflection surface onto a first section of the display area.

5 Claims, 2 Drawing Sheets

(56) References Cited

U.S. PATENT DOCUMENTS

| | | | |
|---|---|---|---|
| 8,813,676 B2* | 8/2014 | Fuller | D06F 39/005 |
| | | | 116/286 |
| 8,876,310 B2* | 11/2014 | Nozaki | H01H 19/025 |
| | | | 362/23.22 |
| 9,542,017 B2* | 1/2017 | Sakai | B29C 45/16 |
| 2006/0102456 A1 | 5/2006 | Kajiwara et al. | |
| 2012/0314397 A1 | 12/2012 | Nozaki et al. | |
| 2014/0211503 A1 | 7/2014 | Tyler et al. | |

FOREIGN PATENT DOCUMENTS

| | | | |
|---|---|---|---|
| JP | 2012084242 A | 4/2012 | |
| JP | 2012150932 A | 8/2012 | |

\* cited by examiner

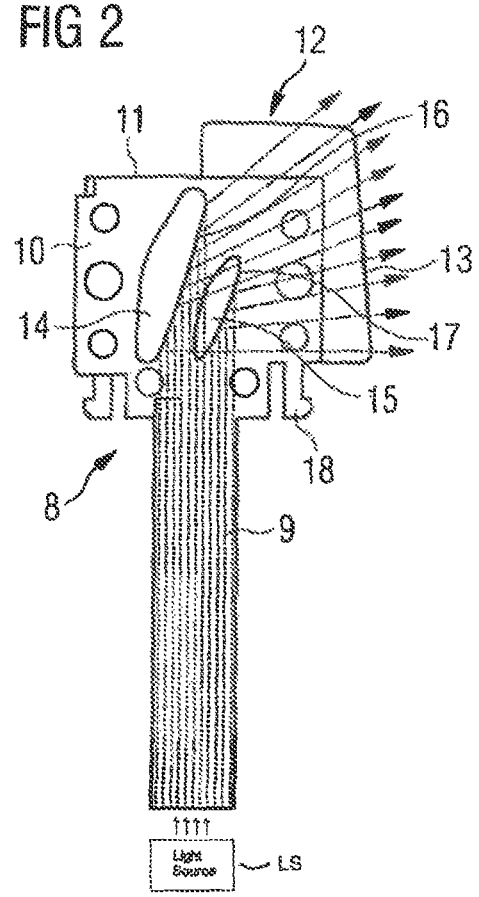
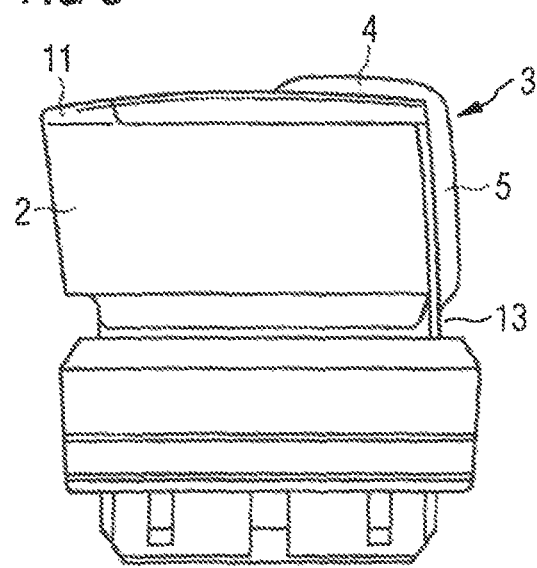

ROTARY ACTUATOR COMPRISING A HOMOGENEOUSLY ILLUMINATED DISPLAY AREA

CROSS-REFERENCES TO RELATED APPLICATIONS

This application is the U.S. National Stage of International Application No. PCT/EP2015/075140, filed Oct. 29, 2015, which designated the United States and has been published as International Publication No. WO 2016/096225 A1 which claims the priority of German Patent Application, Serial No. 102014226621.1, filed Dec. 19, 2014, pursuant to 35 U.S.C. 119(a)-(d).

BACKGROUND OF THE INVENTION

The invention relates to a rotary actuator comprising a cylindrical main body and an actuating handle which is placed on the cylindrical main body and has a display area which can be illuminated.

Rotary actuators of this kind are frequently used for inputting commands to so-called man/machine interfaces. In this case, it is feasible to use said rotary actuators not only to switch control currents but also to switch power by the rotary actuator being used as a tripping means for circuit breakers. These rotary actuators are subject to high demands in respect of service life, robustness and sealing off of the electrical part from water and dirt. In addition, it should be possible to produce said rotary actuators in as cost-effective a manner and with as reliable a process as possible.

These command devices are fitted in switch panels, control panels, switchgear cabinet doors or housing covers. Command devices are generally of modular construction. This means that they comprise an actuator, a fastening part such as an annular nut or a mounting holder for example, and one or more switching elements which are designed as break-contact or make-contact switching elements. For assembly purposes, the actuator is generally guided, from the front, through a hole in the switch panel and fitted from the rear by means of a fastening part. The switching elements are mechanically fastened to the actuator or to the fastening part by screws, snap-action hooks or bolts. The switching elements are electrically connected to the control system by means of connection terminals.

Rotary actuators can assume different switching positions, in order to switch on or switch off a motor for example, by virtue of being rotated. In the case of an illuminated rotary actuator, the illumination identifies the respective switching position. This illumination has to be clearly identifiable from all viewing angles.

SUMMARY OF THE INVENTION

Accordingly, the object of the present invention is that of providing a rotary actuator which allows illumination of the display area, which can be illuminated, in as homogeneous a manner as possible.

The object is achieved in accordance with the invention by a rotary actuator including a cylindrical main body and an actuating handle which is placed on the cylindrical main body and has a display area which can be illuminated. In this case, the invention is distinguished in that a light source is arranged in the cylindrical main body, the light from said light source being reflected by means of a first reflection surface onto a first section of the display area which can be illuminated.

Advantageous refinements and developments, which can be used on their own or in combination with one another, are the subject matter of the dependent claims.

The essence of the invention is to design the light channel within the rotary actuator such that homogeneous illumination of the display area in the actuating handle is ensured. To this end, a light guide guiding channel has been developed which is preferably integrally formed and initially guides the light from a light source, preferably an LED, through a preferably cylindrically shaped light guide. By introducing reflection surfaces into the light channel, the light beams can then be reflected onto the display area which can be illuminated. Since the display area is formed over an edge on the top side and on the side surface of the actuating handle, it is advantageous when different reflection surfaces illuminate different subregions of the display area which can be illuminated, so that homogeneous illumination is produced overall.

In a continuation of this inventive concept, it can be provided that the light from the light source is reflected by means of a second reflection surface onto a second section of the display area which can be illuminated. The different reflection surfaces reflect the light beam onto different subregions of the display area which can be illuminated, so that a homogeneously illuminated display area which is clearly identifiable from all viewing angles is produced overall.

In a special refinement of the invention, a further concept can involve the light from the light source being intended to be guided by means of a light guide to the display area which can be illuminated. The light guide extends from the light source to the actuating handle and in this way ensures that the light beam reaches the display area without obstruction.

In a special refinement of the invention, a further concept can involve the light guide, the first and the second reflection surface and the display area which can be illuminated being formed in a light guide guiding component. Production of the rotary actuator can be considerably simplified by using a functionally optimized component for guiding the light.

In a particularly advantageous refinement of the invention, it can be provided that the light guide guiding component is in the form of a transparent plastic part. The use of plastic enables simple and cost-effective production.

In a continuation of this inventive concept, it can be provided that the light guide guiding component is intended to be inserted into an actuating handle of the rotary actuator from below. In this case, fixing to the actuating handle is simplified owing to the integral design of the light guide guiding component.

In a special refinement of the invention, a further concept can involve the first reflection surface being in the form of an oval recess. Forming a recess in the light guide guiding channel is technically very simple to implement and therefore enables cost-effective production.

In a special refinement of the invention, a further concept can involve the second reflection surface being in the form of an oval recess. Forming a recess in the light guide guiding channel is technically very simple to implement and therefore enables cost-effective production.

In a particularly advantageous refinement of the invention, it can be provided that the first reflection surface is formed behind the second reflection surface, as viewed from the display area which can be illuminated. The arrangement of the reflection surfaces should advantageously be selected such that the entire display area in the actuating head is homogeneously illuminated. The above-described arrangement has proven very advantageous for this purpose.

In a continuation of this inventive concept, it can be provided that the first and second sections of the display area which can be illuminated are at an angle of approximately 90° in relation to one another. As a result, the switching position can also be clearly seen from the side and not only from above.

The rotary actuator according to the invention has a cylindrical main body and an actuating handle which is placed on the cylindrical main body and has a display area which can be illuminated. The display area which can be illuminated preferably has two sections which are arranged at an angle of preferably 90° in relation to one another. In this case, the first section is preferably arranged on the top side of the actuating handle. The second section of the display area which can be illuminated is positioned on the side surface of the actuating handle at an angle of approximately 90° in relation to the first section.

The actuating handle is rotatably mounted in the cylindrical main body of the rotary actuator. An insert base is positioned in the cylindrical main body of the rotary actuator, which insert base engages, by way of latching hooks, with corresponding contours of the inner surface of the cylindrical main body of the rotary actuator and as a result is installed in a positionally stable manner. The insert base engages, by way of its contours, with corresponding contours of a crown. A light guide guiding component which is guided through the preferably cylindrical crown is arranged between the insert base and the actuating handle. A spring element which enables the actuating handle to be reset is arranged between the crown and the light guide guiding component. The light guide guiding component is fixed to the actuating handle and, when actuation occurs, carries along the crown, so that the crown, including the light guide guiding component, shifts to a position which is offset through 45° in relation to the insert base. In this switching position, the contours on the insert base no longer engage with the corresponding contours of the crown.

The light guide guiding component has a preferably cylindrical light guide which preferably issues integrally into a cuboidal subsection. A projection is positioned on the top side of the cuboidal subsection, which projection also extends from the side surface of the cuboidal subsection and forms the display area which can be illuminated. Two oval recesses are preferably arranged in the cuboidal subsection, wherein that recess which has the larger surface area is positioned behind the recess which has the smaller surface area and is at a further distance from the display area which can be illuminated than the smaller recess. The recesses each have a side edge which is situated closest to the display area which can be illuminated. These side edges serve as reflection surfaces and reflect a light beam which, having been emitted by a light source, strikes the reflection surfaces by way of the light guide and is reflected from said reflection surfaces onto the two sections of the display area which can be illuminated. In this case, the reflection surface of the larger recess preferably reflects the light onto the first section of the display area, which can be illuminated, on the top side, and the reflection surface of the smaller recess preferably reflects the light onto the second section of the display area, which can be illuminated, on the side surface of the actuating handle. Latching hooks are arranged on the bottom side of the cuboidal subsection. The light guide guiding component is preferably manufactured from a transparent plastic, in particular from polycarbonate.

The rotary actuator according to the invention with homogeneous illumination of the display area is distinguished by a light guide guiding component which is integrally formed and homogeneously illuminates the display area by means of correspondingly positioned reflection surfaces in the light channel. This homogeneous illumination is also always ensured in the different switching positions by virtue of the display area being coupled to the light guide guiding component.

BRIEF DESCRIPTION OF THE DRAWINGS

Further advantages and embodiments of the invention will be explained below with reference to an exemplary embodiment and with reference to the drawing.

In the drawing:

FIG. 2 schematically shows, in a front view, the light guide guiding component including the light beams which strike the reflection surface and are reflected; and FIG. 3 schematically shows, in a perspective illustration, the actuating handle comprising the display area which can be illuminated.

DETAILED DESCRIPTION OF THE EMBODIMENTS

Figure 1:
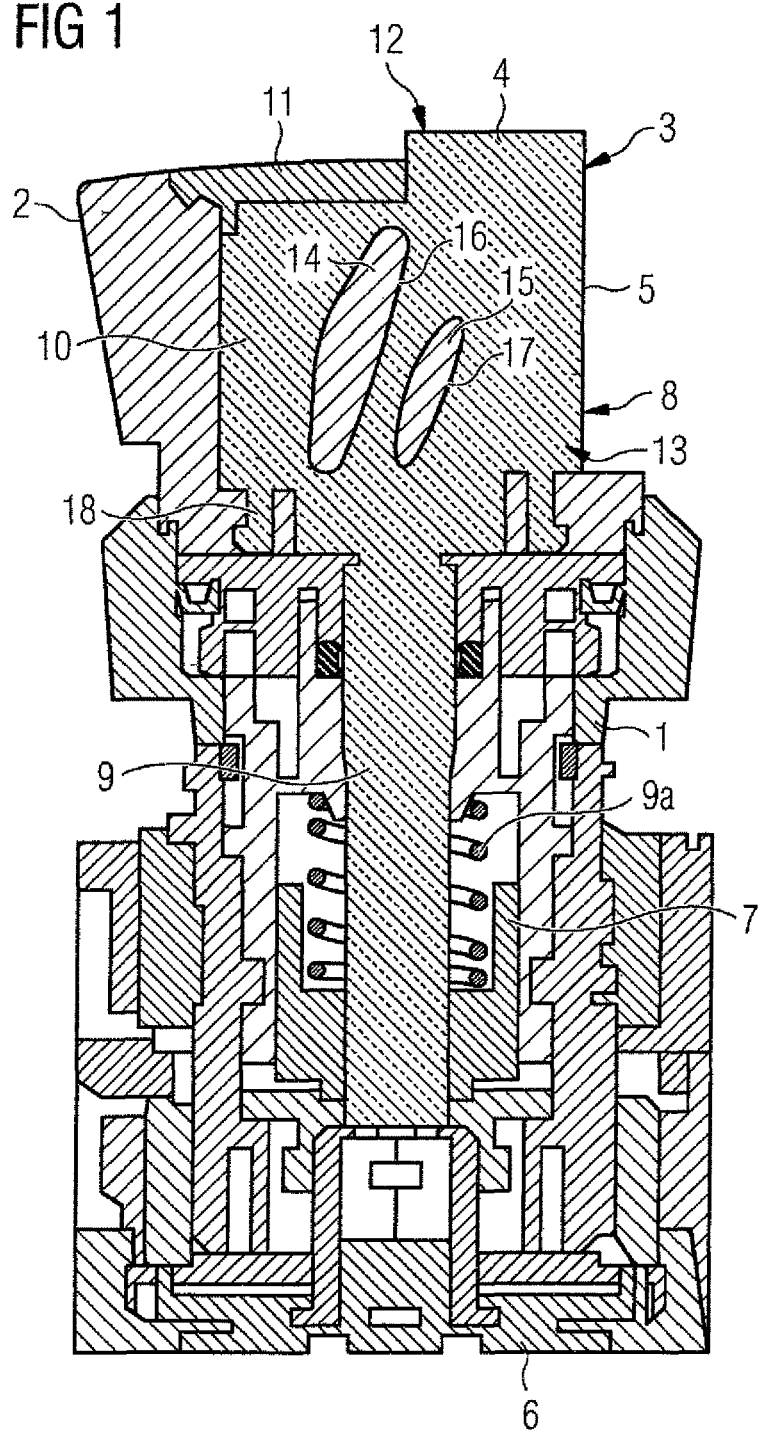
FIG. 1 schematically shows, in a sectional illustration, an exemplary embodiment of a rotary actuator according to the invention comprising a light guide guiding component.

FIG. 1 shows a rotary actuator according to the invention comprising a cylindrical main body 1 and an actuating handle 2 which is placed on the cylindrical main body 1 and has a display area 3 which can be illuminated. The display area 3 which can be illuminated preferably has two sections 4, 5 which are arranged at an angle of preferably approximately 90° in relation to one another. In this case, the first section 4 is preferably arranged on the top side 11 of the actuating handle 2. The second section 5 of the display area 3 which can be illuminated is positioned on the side surface 13 of the actuating handle 2 at an angle of approximately 90° in relation to the first section 4.

The actuating handle 2 is rotatably mounted in the cylindrical main body 1 of the rotary actuator. An insert base 6 is positioned in the cylindrical main body 1 of the rotary actuator, which insert base engages, by way of latching hooks, with corresponding contours of the inner surface of the cylindrical main body 1 of the rotary actuator and as a result is installed in a positionally stable manner. The insert base 6 engages, by way of its contours, with corresponding contours of a crown 7. A light guide guiding component 8 which is guided through the preferably cylindrical crown 7 is arranged between the insert base 6 and the actuating handle 2. A spring element 9a which enables the actuating handle 2 to be reset is arranged between the crown 7 and the light guide guiding component 8. The light guide guiding component 8 is fixed to the actuating handle 2 and, when actuation occurs, carries along the crown 7, so that the crown 7, including the light guide guiding component 8, shifts to a position which is offset through 45° in relation to the insert base 4. In this switching position, the contours on the insert base 6 no longer engage with the corresponding contours of the crown 7.

The light guide guiding component 8 has a preferably cylindrical light guide 9 which preferably issues integrally into a cuboidal subsection 10. A projection 12 is positioned on the top side 11 of the cuboidal subsection 10, which projection also extends from the side surface 13 of the cuboidal subsection 10 and forms the display area 3 which can be illuminated. Two oval recesses 14, 15 are preferably arranged in the cuboidal subsection 10, wherein that recess 14 which has the larger surface area is positioned behind the recess 15 and is therefore at a further distance from the display area 3 which can be illuminated than the recess 15. The recesses 14, 15 each have a side edge which is situated closest to the display area 3 which can be illuminated. These side edges serve as reflection surfaces 16, 17 and reflect a light beam which, having been emitted by a light source LS (FIG. 2), strikes the reflection surfaces 16, 17 by way of the light guide 9 and is reflected from said reflection surfaces onto the two sections 4, 5 of the display area 3 which can be illuminated. In this case, the reflection surface 16 of the recess 14 preferably reflects the light onto the first section 4 of the display area 3, which can be illuminated, on the top side 11, and the reflection surface 17 of the recess 15 preferably reflects the light onto the second section 5 of the display area 3, which can be Illuminated, on the side surface 13 of the actuating handle 2. Latching hooks 18 are arranged on the bottom side of the cuboidal subsection 10. The light guide guiding component 8 is preferably manufactured from a transparent plastic, in particular from polycarbonate.

FIG. 2 illustrates the light guide guiding component 8 including the light beams which strike the reflection surface 16, 17 and are reflected. It is clear from the illustration that the reflection surfaces 16, 17 illuminate the different sections 4, 5 of the display area 3 which can be illuminated. The reflection surface 16 of the recess 14 preferably reflects the light onto the first section 4 of the display area 3, which can be illuminated, on the top side, and the reflection surface 17 of the recess 15 preferably reflects the light onto the second section 5 of the display area 3, which can be illuminated, on the side surface of the actuating handle 2. A homogeneously illuminated display area 3 is produced as a result.

FIG. 3 shows the actuating handle 2 comprising the display area 3 which can be illuminated. FIG. 3 clearly shows the two sections 4, 5 of the display area 3 which can be illuminated, which sections are arranged at an angle of preferably approximately 90° in relation to one another. In this case, the first section 4 is preferably arranged on the top side 11 of the actuating handle 2. The second section 5 of the display area 3 which can be illuminated is positioned on the side surface 13 of the actuating handle 2 at an angle of approximately 90° in relation to the first section.

The rotary actuator according to the invention comprising a homogeneously illuminated display area is distinguished by a light guide guiding component which is integrally formed and homogeneously illuminates the display area by means of correspondingly positioned reflection surfaces in the light channel. This homogeneous illumination is also always ensured in the different switching positions by virtue of the display area being coupled to the light guide guiding component.

What is claimed is:

1. A rotary actuator, comprising:
a cylindrical main body extending in an axial direction;
an actuating handle placed on one axial end of the cylindrical main body and having an illuminatable display area with a first section and a second section;
a first reflection surface;
a second reflection surface,
wherein the first section of the display area extends transversely to the axial direction and the second section of the display area extends along the axial direction so that the first section and the second section extend at an angle of substantial 90 degrees in relation to one another,
wherein the cylindrical main body has two oval recesses formed therein and spaced from each other in a direction which is transverse to the axial direction and each having oval side edges situated closest to the display area and forming the first reflection area and the second reflection area correspondingly
wherein the first reflection surface is formed behind the second reflection surface when viewed from the display area and is spaced from the second reflection surface in a direction which is transverse to the axial direction; and
a light source arranged in the cylindrical main body, said light source emitting light which is reflected via the first reflection surface onto the first section of the display area and via the second reflection surface onto the second section of the display area.

2. The rotary actuator of claim 1, further comprising a light guide for guiding the light from the light source to the display area.

3. The rotary actuator of claim 2, further comprising a light guide guiding component configured to form the light guide, the first reflection surface, the second reflection surface and the display area.

4. The rotary actuator of claim 3, wherein the light guide guiding component is constructed in the form of a transparent plastic part.

5. The rotary actuator of claim 3, wherein the light guide guiding component is configured for insertion into the actuating handle from below.

* * * * *